Feb. 12, 1929.
J. A. REEDY
1,701,796
COTTON CLEANING MACHINE
Filed Aug. 6, 1927
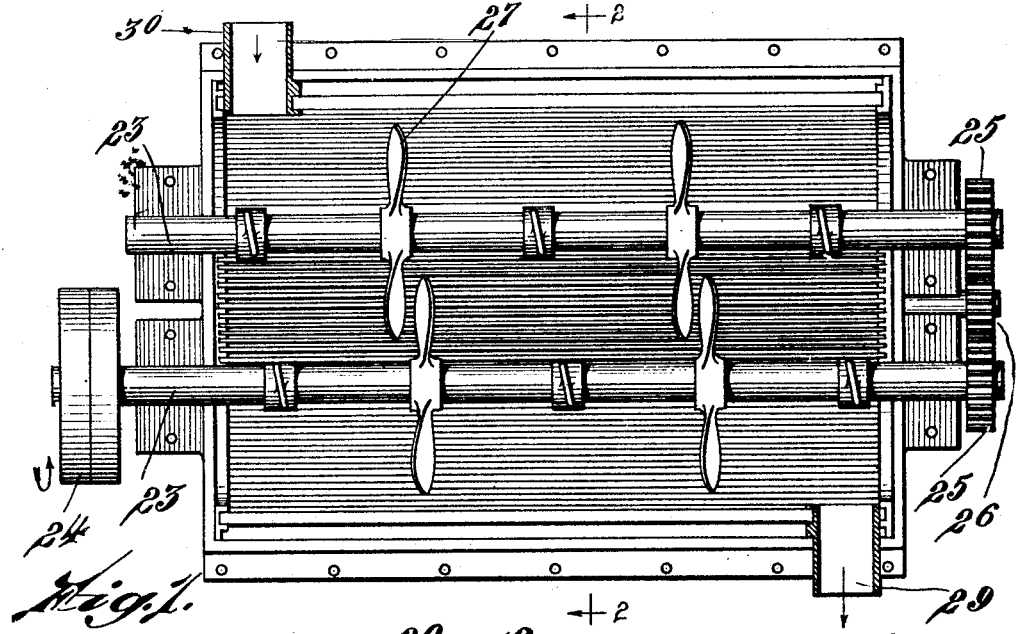
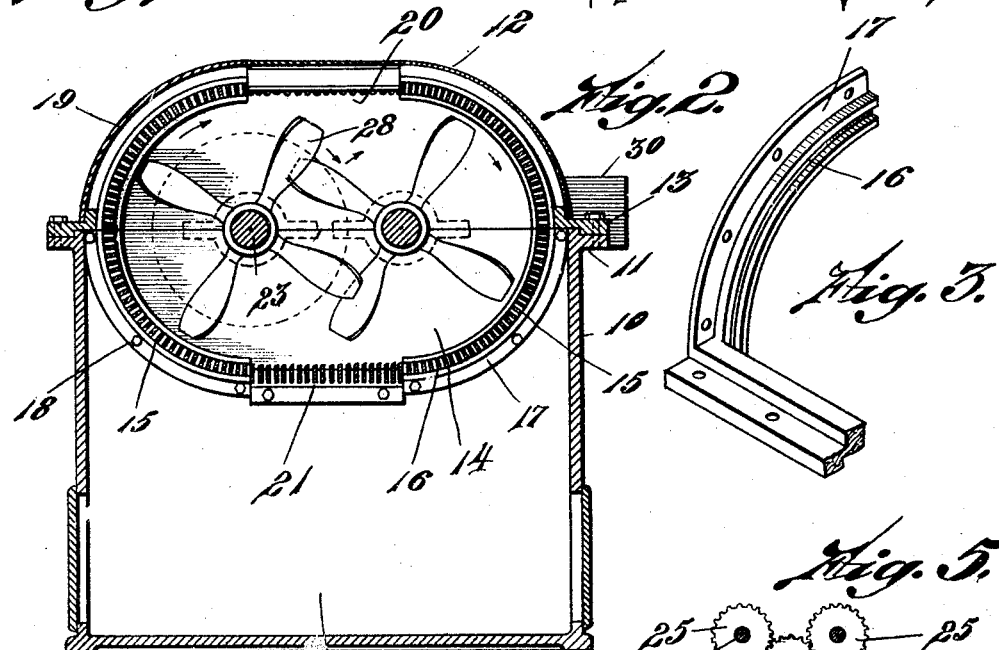
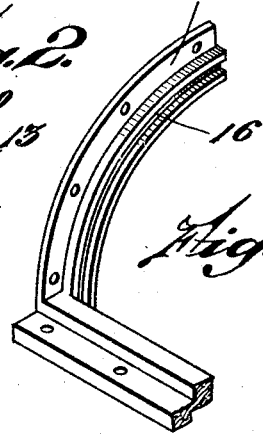
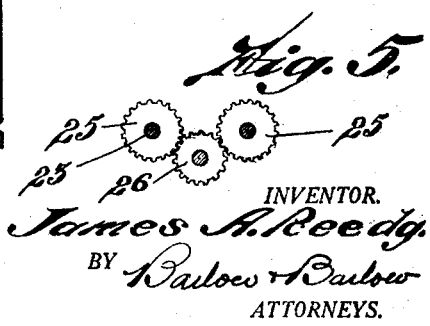
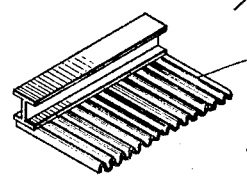
INVENTOR.
James A. Reedy.
BY Barlow & Barlow
ATTORNEYS.

Patented Feb. 12, 1929.

1,701,796

UNITED STATES PATENT OFFICE.

JAMES ALOYIOUS REEDY, OF WOONSOCKET, RHODE ISLAND.

COTTON-CLEANING MACHINE.

Application filed August 6, 1927. Serial No. 211,184.

This invention relates to a cotton-cleaning machine; and has for its object to provide in such a machine means for acting upon the cotton as fed to the machine and extracting the foreign matter from the cotton and at the same time propelling or feeding the cotton longitudinally through the machine and finally discharging the cleaned product from the opposite ends of the machine.

A further object of the invention is the provision of a beating chamber formed within the outer casing, the chamber being provided with a pair of spaced driving shafts on which sets of propeller blades are mounted, the set on one shaft cooperating with those on the other shaft to act upon the cotton as fed to the machine to loosen up and separate the fibers of the cotton and feed the same longitudinally through the machine by the propelling action of the blades and simultaneously force the foreign matter from the loosened fibers of the cotton out through the opening in the walls of the beating chamber.

With these and other objects in view, the invention consists of certain novel features of construction, as will be more fully described, and particularly pointed out in the appended claims.

In the accompanying drawings:

Fig. 1 is a top view of the casing of a cotton cleaning machine with the top removed and showing the shafts with cooperating propelling blades or arms mounted on the shafts.

Fig. 2 is a section on line 2—2 of Fig. 1 showing the beating chamber having its walls formed of grid bars spaced from the outer wall of the chamber forming a channel into which the foreign matter may be forced.

Fig. 3 is a section of the frame which is grooved to receive the ends of the grid bars and is adapted to be bolted to the inner sides of the casing.

Fig. 4 is a fragmental portion of the section of corrugated material which forms the upper wall of the center portion of the beating chamber.

Fig. 5 is an end view of the machine showing the arrangement of the gears by which the two shafts are connected together to run in the same direction.

It is found in the practical operation of cotton cleaning machines of this character, necessary to break up the cotton as fed to the machine and so separate the fibers and make the cotton light and fluffy, in order to permit a thorough cleaning of the foreign matter therefrom; and to accomplish this in a simple and effective way, I have provided a beating chamber mounted in the casing, the walls of the chamber being formed of longitudinally-disposed and closely-spaced grid bars mounted in the casing about the chamber so that the foreign matter may be driven out through the openings between the grid bars all as the cotton is thrashed about in the chamber. Also, it has been found of advantage to provide a corrugated portion at the top of the beating chamber to obtain a washboard effect as the cotton is forced and dragged against it to assist in opening up the same; also, it is found of advantage to provide a pair of spaced shafts and mount on each a set of propellers which are spaced along the shafts, said sets being arranged to cooperate with each other so that the blades which pass each other in opposite directions are caused to open and more thoroughly pull apart and separate the fibers of the cotton and loosen the same up to permit the foreign matter to be more readily driven therefrom and permit a more thorough cleaning of the same; and the following is a detailed description of the invention and showing one arrangement of mechanism by which these advantageous results may be accomplished:—

This invention relates to a cotton-cleaning machine and has for its object to provide such a machine having a casing 10 which may be formed of any suitable material and in any suitable way, the lower portion providing a receptacle for the foreign matter and the upper edges of this casing are flanged as at 11 and a lid or cover 12 is provided for the casing which is also flanged as at 13 to be bolted to the casing flange 11. Within this casing, I have formed a beating chamber 14 which is in somewhat of an oval shape in cross section and the side walls 15 of the chamber are formed of spaced grid bars which run lengthwise of the machine, the ends of the bars being supported in the grooves 16 in the frame 17 and are separated by spacers (not shown) which are positioned between the ends of the bars as they are set in the grooves 16, said spaces forming waste discharge openings. These frames 17 are secured to the ends of the outer casing by bolts 18 and by means of these frames 17 a space 19 is provided between the outer walls of the beating chamber and the inner walls of the casing for the reception of the foreign matter forced through the spaces between the bars. The top section of this beating chamber is preferably formed of corrugated iron as at 20, the corrugations running lengthwise of the machine and serving to act as a washboard for the purpose of assisting in opening up and spreading the fibers as drawn thereover. The bottom section 21 is formed of a set of grid bars preferably slightly different from those forming the end walls of this chamber, these latter bars being set vertically and their upper edges are sharpened or formed thin to better engage the foreign matter as the cotton is drawn therefrom and conduct it down into the storage space 22 below in the lower portion of the casing.

In this chamber, I have mounted a pair of shafts 23 which are driven from the pulleys 24, the shafts being geared together at one end by gears 25 through the idler 26 to both run in the same direction. On each of these shafts, I have mounted sets of propellers 27, each propeller of each set being herein shown as provided with two arms 28 and these arms are enlarged at their outer ends and tipped or pitched similarly to a propeller or fan to act upon the cotton, first to throw it outwardly by centrifugal force against the inner surface of the beating chamber to drag it over the grid bars and open it up and at the same time the pitch of the propeller blades serves to advance the cotton longitudinally along the length of the chamber and finally discharge it through the outlet opening 29. The cotton is admitted to the machine through the inlet opening 30.

The propeller arms of each set are arranged to overlap each other slightly and are set sufficiently out of alignment to run clear and freely pass each other as the adjacent blades move in opposite directions, which movement serves to well open up the fibers of the cotton mass.

It will be noted that the rotation of the shafts and propellers is such as to first engage the entering cotton and to beat it downward and drag it over the bottom bars so that its initial discharge of foreign matter will be drawn down through the bottom grid bars into the lower casing.

The inner end of the inlet tube 30 extends thru the bars to have a free discharge into the beating chamber and the outlet 29 at the opposite end of the machine also is arranged to extend through the grid bars to permit a free discharge of the cleaned cotton therethrough.

By the use of my improved cotton-cleaning machine and owing to its efficient cleaning action upon the cotton and also its action upon the cotton to open it up and render the cotton fluffy and separate the fibers to release the foreign matter I eliminate several machines which have heretofore been required to place the cotton in the condition it is in when it leaves my machine. Also, by the shape and pitch of my blades I set up within the machine a blowing action which causes a draft of air along the length thereof, which draft also causes or acts to blow and so assist in removing the dust and other impurities from the cotton and forcing it out through the spaces between the grid bars, which air draft also serves to force the cleaned cotton out through the opening at the discharge end of the machine.

My improved machine is simple and practical in its operation and by its use the process of cotton cleaning is greatly facilitated.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a cotton cleaning machine, a casing, a beating chamber in the casing, waste discharge openings in the chamber, a pair of spaced parallel shafts in the chamber, a plurality of cooperating propelling blades mounted on and spaced along the length of each shaft, the blades of the adjacent propellers on each shaft being set to cut the horizontal plane of said shaft successively, and means for rotating the shafts in the same direction and in time with each other causing the propeller blades to pass each other in opposite directions to act upon the cotton mass and separate its fibers to release the foreign matter therefrom, said blades being pitched to act successively on the cotton and being the sole means to advance the cotton along said chamber from the inlet to the discharge openings while being pulled apart and cleaned.

2. In a cotton cleaning machine, a casing, a beating chamber in the casing, the walls of the chamber having a multiplicity of longitudinally-extending waste discharge openings, a section of the lower wall having longitudinally-disposed grids adjacent the waste discharge openings, a pair of spaced parallel shafts positively driven in opposite directions and in time with each other, a plurality of cooperating propelling blades mounted on and spaced along the length of each shaft from one end to the other end of said chamber, the propelling blades being of a length to just clear the adjacent shaft, an inlet and an outlet passageway for said chamber adjacent opposite ends of the machine, the blades on each shaft being pitched and advanced radially about the center of its shaft to create an air draft to act upon the cotton to advance it progressively and drag it over the inner walls of the chamber to open up the cotton and discharge the foreign matter therefrom thru the waste discharge openings, the pitch of the blades of the propeller being the sole means to advance the cotton from its inlet along said chamber and out thru its discharge opening.

In testimony whereof I affix my signature.

JAMES ALOYIOUS REEDY.